(12) United States Patent
Ishida et al.

(10) Patent No.: US 9,170,422 B2
(45) Date of Patent: Oct. 27, 2015

(54) IMAGE DISPLAY APPARATUS AND HEAD-MOUNTED DISPLAY

(71) Applicant: Seiko Epson Corporation, Tokyo (JP)

(72) Inventors: Daisuke Ishida, Fujimi (JP); Masatoshi Yonekubo, Hara (JP); Shuichi Wakabayashi, Okaya (JP)

(73) Assignee: Seiko Epson Corporation (JP)

(*) Notice: Subject to any disclaimer, the term of this patent is extended or adjusted under 35 U.S.C. 154(b) by 323 days.

(21) Appl. No.: 13/908,381

(22) Filed: Jun. 3, 2013

(65) Prior Publication Data

US 2013/0321891 A1    Dec. 5, 2013

(30) Foreign Application Priority Data

Jun. 4, 2012    (JP) ................. 2012-127448

(51) Int. Cl.
- G02B 26/08    (2006.01)
- G02B 27/01    (2006.01)
- H04N 9/31    (2006.01)

(52) U.S. Cl.
CPC .......... G02B 27/0172 (2013.01); H04N 9/3129 (2013.01)

(58) Field of Classification Search
CPC .......... G02B 27/0172; G02B 26/0808; G02B 26/105; G02B 26/12; G02B 26/125
USPC .......... 359/212.1, 213.1, 214.1, 223.1–226.1
See application file for complete search history.

(56) References Cited

U.S. PATENT DOCUMENTS

| | | | |
|---|---|---|---|
| 7,834,867 | B2 | 11/2010 | Sprague et al. |
| 2008/0310002 | A1 | 12/2008 | Shikita et al. |
| 2010/0026961 | A1* | 2/2010 | Oniki ............................ 359/237 |
| 2010/0302513 | A1 | 12/2010 | Takahashi et al. |
| 2011/0157668 | A1 | 6/2011 | Maeda |
| 2011/0205501 | A1 | 8/2011 | Cobb |
| 2013/0321889 | A1 | 12/2013 | Mizoguchi et al. |
| 2013/0321890 | A1 | 12/2013 | Ishida et al. |

FOREIGN PATENT DOCUMENTS

| | | |
|---|---|---|
| EP | 2 151 705 A1 | 2/2010 |
| EP | 2 339 855 A1 | 6/2011 |
| JP | 2008-304726 A | 12/2008 |
| JP | 2009-533715 A | 9/2009 |
| JP | 2010-032797 A | 2/2010 |
| JP | 2011-008221 A | 1/2011 |
| JP | 2011-154344 A | 8/2011 |

OTHER PUBLICATIONS

Extended European Search Report for Application No. EP 13 17 0026 dated Apr. 25, 2014 (6 pages).

* cited by examiner

*Primary Examiner* — Euncha Cherry
(74) *Attorney, Agent, or Firm* — Harness, Dickey & Pierce, P.L.C.

(57) ABSTRACT

An image display apparatus including a plurality of light source sections, a light combining section that combines light fluxes, an optical element that inclines an optical axis, and an optical scan section that deflects light for scanning, wherein an optical axis of the light flux from each of the plurality of light source sections to the optical scan section is present in a first plane, the optical scan section has a light reflection surface that is perpendicular to the first plane and swings around a first axis present in the first plane and a second axis parallel to the direction of a normal to the first plane, and an angle of radiation of the light flux in the direction of the normal to the first plane is greater than that of the light flux in an in-plane direction in the first plane.

20 Claims, 9 Drawing Sheets

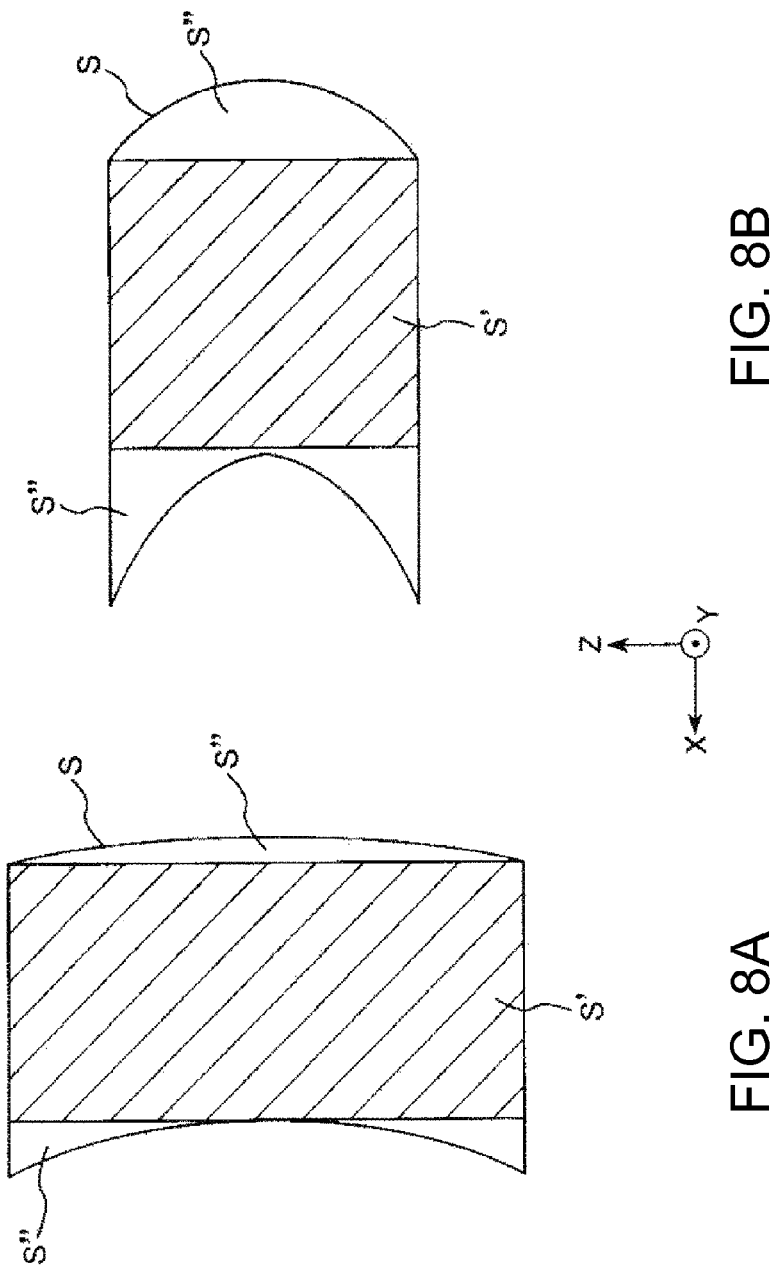

IMAGE DISPLAY APPARATUS AND HEAD-MOUNTED DISPLAY

BACKGROUND

1. Technical Field

The present invention relates to an image display apparatus and a head-mounted display.

2. Related Art

For example, as an image display apparatus for displaying an image on a screen, there is a known configuration including a light source and an optical scanner that deflects light from the light source for two-dimensional scanning (see JP-A-2011-154344, for example).

The image display apparatus described in JP-A-2011-154344 includes three semiconductor lasers, a beam supplying section including a coupling lens corresponding to each of the semiconductor lasers, dichroic mirrors, and a collector lens, and a beam deflecting section that deflects a beam emitted from the beam supplying section for two-dimensional scanning. A light reflection surface of a reflection mirror provided in the beam deflecting section is parallel to the optical axis of the beam emitted from each of the semiconductor lasers and disposed in a position shifted from the optical axis in the thickness direction of an enclosure. A flat mirror is therefore provided between the beam supplying section and the beam deflecting section, and the beam emitted from the beam supplying section is reflected off the flat mirror in the thickness direction of the enclosure and then incident on the reflection mirror of the beam deflecting section.

In the image display apparatus described in JP-A-2011-154344, however, since no optical element that changes the cross-sectional shape of the beam is provided, it is difficult to display a high-quality image. Further, in the image display apparatus described in JP-A-2011-154344, since the beam is deflected in the thickness direction of the enclosure before incident on the reflection mirror, complicated three-dimensional alignment of the components in the apparatus is required, which prevents the apparatus from being readily assembled.

SUMMARY

An advantage of some aspects of the invention is to provide an image display apparatus that can be readily assembled and can provide excellent image display characteristics and a head-mounted display including the image display apparatus.

An image display apparatus according to an aspect of the invention includes a plurality of light source sections each of which emits a light flux, a light combining section that combines the light fluxes emitted from the plurality of light source sections, an optical element that inclines an optical axis of the combined light from a light combining section and changes a cross-sectional shape of the combined light from the light combining section, and an optical scan section that deflects light exiting out of the optical element for two-dimensional scanning, an optical axis of the light flux emitted from each of the plurality of light source sections and directed through the light combining section and the optical element toward the optical scan section is present in a first plane, the optical scan section has a light reflection surface that is configured to be perpendicular to the first plane when the optical scan section is not driven and swings around a first axis present in the first plane and a second axis parallel to the direction of a normal to the first plane, and an angle of radiation of the light flux emitted from each of the plurality of light source sections in the direction of the normal to the first plane is greater than an angle of radiation of the emitted light flux in an in-plane direction in the first plane.

The image display apparatus described above can be readily assembled and can provide excellent image display characteristics.

In the image display apparatus according to the aspect of the invention, it is preferable that the optical element is a prism.

The prism, which has a simple configuration, can incline the optical axis of light and change the cross-sectional shape of the light.

In the image display apparatus according to the aspect of the invention, it is preferable that the light flux emitted from each of the light source sections is linearly polarized light that behaves as s-polarized light with respect to a light incident surface of the prism.

In this way, for example, loss of the light flux produced when the light flux passes through the prism, which is an optical element, can be reduced.

In the image display apparatus according to the aspect of the invention, it is preferable that the prism increases the width of the cross-sectional shape of the combined light from the light combining section in the in-plane direction in the first plane.

An elliptical (or oval) cross-sectional shape of the light flux immediately after it is emitted from each light source can thus be changed to a substantially circular shape, whereby the image display characteristics can be improved.

In the image display apparatus according to the aspect of the invention, it is preferable that a light exiting surface of the prism is a light collecting lens surface.

In this way, when an image is displayed on an object located in a position in the vicinity of the focal point of the lens surface, better image display characteristics are provided.

It is preferable that the image display apparatus according to the aspect of the invention further includes a detector that detects the amount of light reflected off the light incident surface of the prism and a controller that controls drive operation of the light source sections based on the amount of light detected by the detector.

Light of a desired color and intensity can thus be produced, whereby excellent image display characteristics are provided.

In the image display apparatus according to the aspect of the invention, it is preferable that the light reflection surface is irradiated with the combined light traveling in a direction inclined to a normal to the light reflection surface.

The light deflected by the optical scan section for two-dimensional scanning is therefore incident on an object without interfering with other members (prism, for example) in the apparatus. In other words, it is not necessary to provide a flat mirror or any other optical component for changing the optical path of the light deflected by the optical scan section for two-dimensional scanning, whereby the size of the image display apparatus can be reduced.

In the image display apparatus according to the aspect of the invention, it is preferable that the amplitude of the swing motion of the light reflection surface around the first axis is greater than the amplitude of the swing motion of the light reflection surface around the second axis.

In this way, an effective drawing region contained in a light drawable region and used to actually display an image can be increased.

In the image display apparatus according to the aspect of the invention, it is preferable that the plurality of light source sections, the light combining section, the optical element, and the optical scan section are arranged in the in-plane direction in the first plane.

The components can therefore be readily attached to and aligned with each other, whereby the image display apparatus can be more readily assembled.

In the image display apparatus according to the aspect of the invention, it is preferable that the optical scan section includes a movable portion having the light reflection surface, a frame that surrounds the movable portion, a support member that supports the frame, a first shaft that connects the movable portion to the frame in such a way that the movable portion is swingable around the first axis relative to the frame, and a second shaft that connects the frame to the support member in such a way that the frame is swingable around the second axis relative to the support member.

The optical scan section described above has a simple configuration, and the size of the optical scan section can be reduced.

In the image display apparatus according to the aspect of the invention, it is preferable that the optical scan section further includes a permanent magnet provided on the frame and a coil that faces the frame and produces a magnetic field that acts on the permanent magnet.

In the configuration described above, the thickness of the optical scan section in the direction of the normal to the light reflection surface increases, whereas the width of the optical scan section in the in-plane direction of the light reflection surface can be reduced. The thus shaped optical scan section is suitable for the image display apparatus according to the aspect of the invention.

A head-mounted display according to another aspect of the invention includes a light reflector that reflects at least part of light incident thereon, and an image display apparatus that irradiates light to the light reflector, the image display apparatus including a plurality of light source sections each of which emits a light flux, a light combining section that combines the light fluxes emitted from the plurality of light source sections, an optical element that inclines an optical axis of a combined light from the light combining section and changes a cross-sectional shape of the combined light from the light combining section, and an optical scan section that deflects light exiting out of the optical element for two-dimensional scanning, an optical axis of the light flux emitted from each of the plurality of light source sections and directed through the light combining section and the optical element toward the optical scan section is present in a first plane, the optical scan section has a light reflection surface that is configured to be perpendicular to the first plane when the optical scan section is not driven and swings around a first axis present in the first plane and a second axis parallel to the direction of a normal to the first plane, and an angle of radiation of the light flux emitted from each of the plurality of light source sections in the direction of the normal to the first plane is greater than an angle of radiation of the emitted light flux in an in-plane direction in the first plane.

A head-mounted display having excellent image characteristics can thus be provided.

BRIEF DESCRIPTION OF THE DRAWINGS

The invention will be described with reference to the accompanying drawings, wherein like numbers reference like elements.

FIGS. 8A and 8B show a difference in drawable region caused by how the optical scanner is disposed.

DESCRIPTION OF EXEMPLARY EMBODIMENTS

An image display apparatus and a head-mounted display according to preferred embodiments of the invention will be described below with reference to the accompanying drawings.

1. Image Display Apparatus

Figure 1:
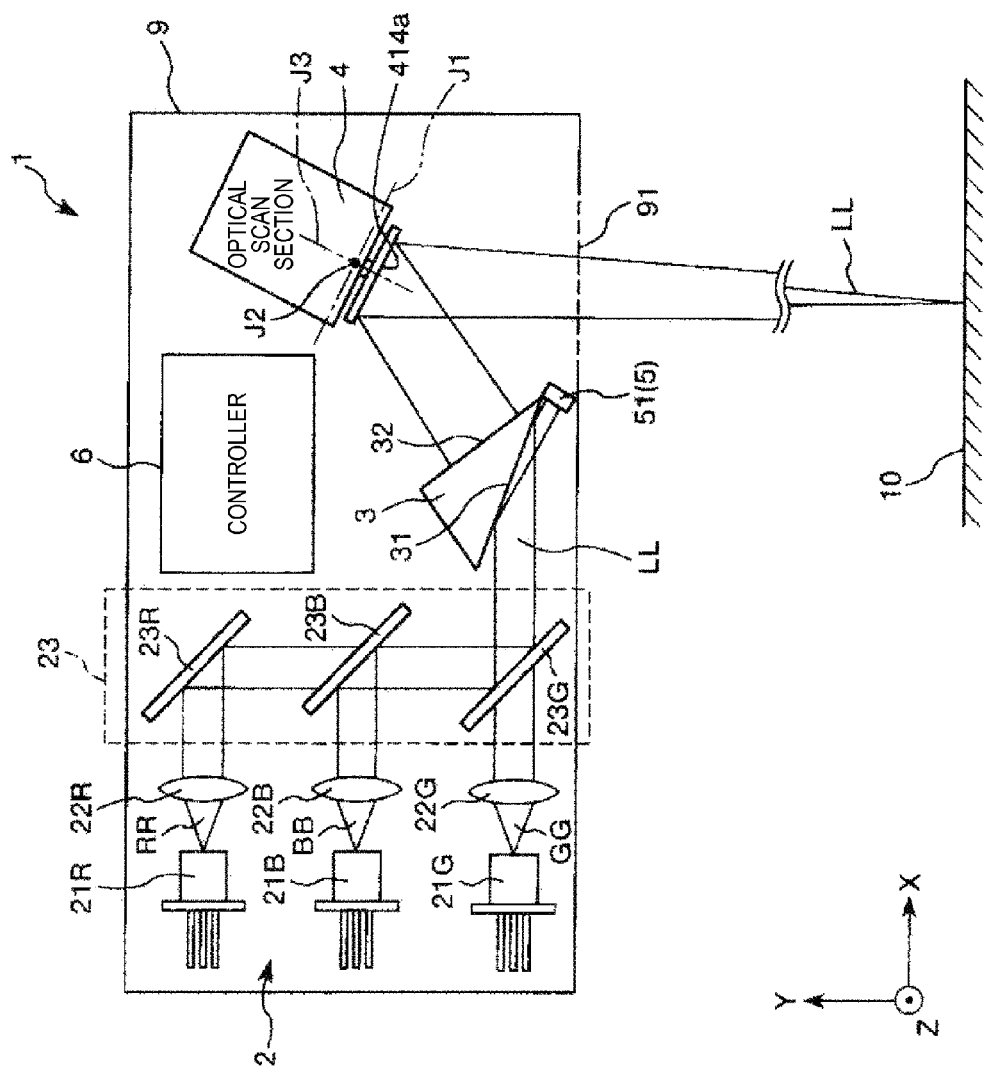
FIG. 1 is a plan view showing an image display apparatus according to a preferred embodiment of the invention.
Figure 2:
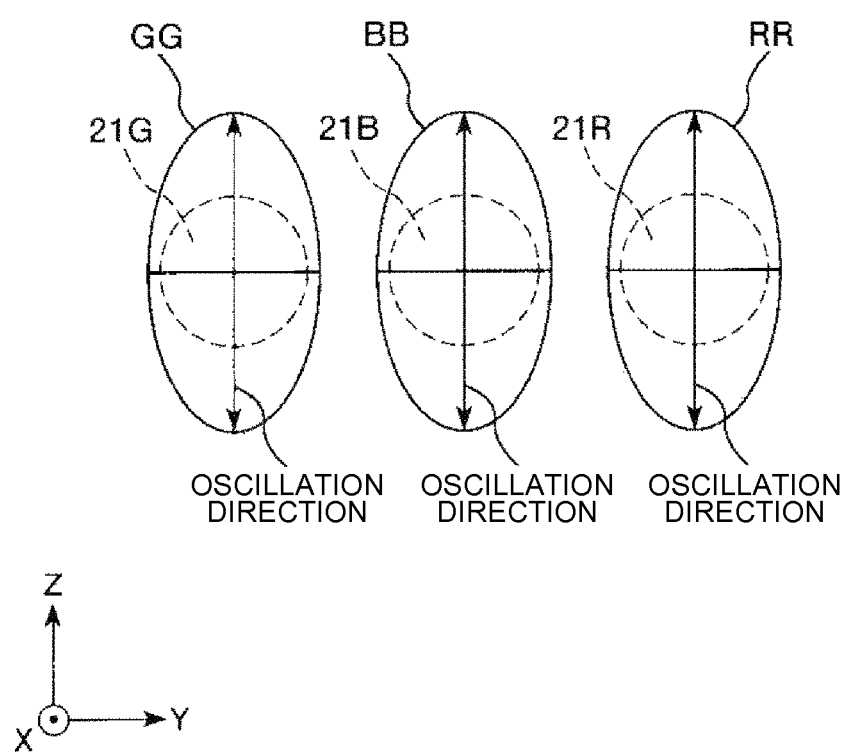
FIG. 2 is a cross-sectional view of a laser light flux emitted from each laser light source shown in FIG. 1.
Figure 3:
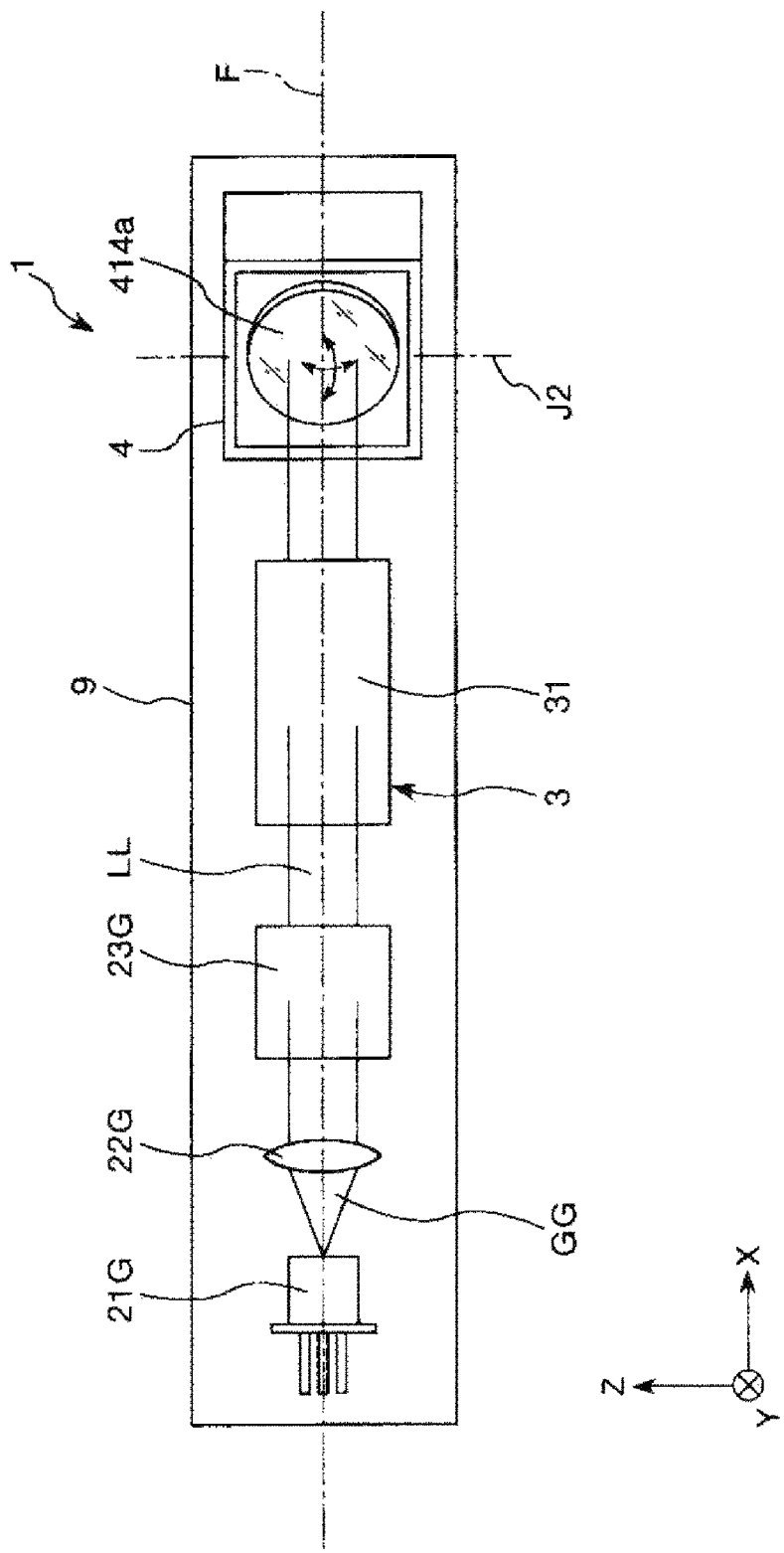
FIG. 3 is a side view of the image display apparatus shown in FIG. 1.
Figure 4:
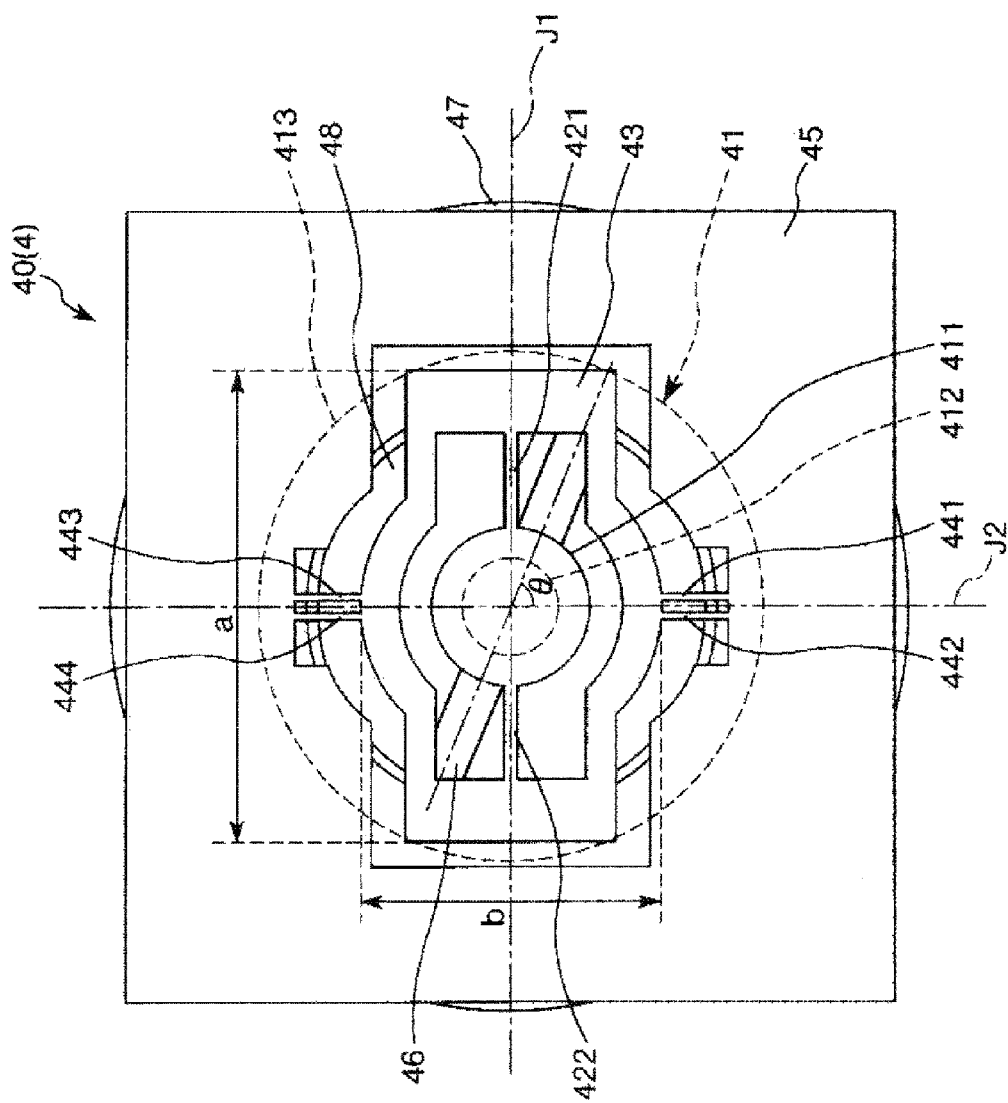
FIG. 4 is a plan view showing an optical scan section (optical scanner) provided in the image display apparatus shown in FIG. 1.
Figure 5:
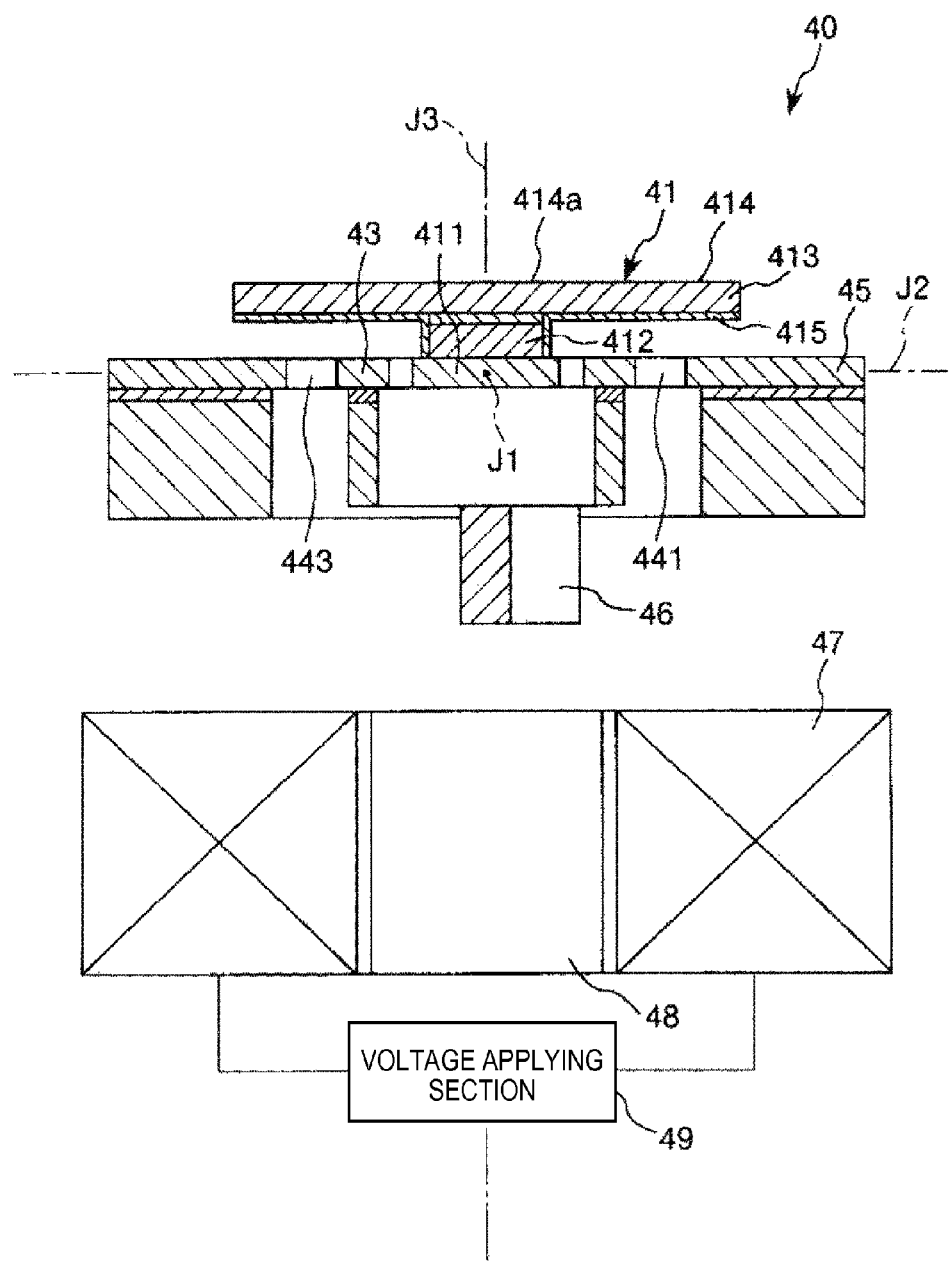
FIG. 5 is a cross-sectional view of the optical scanner shown in FIG. 4.
Figure 6:
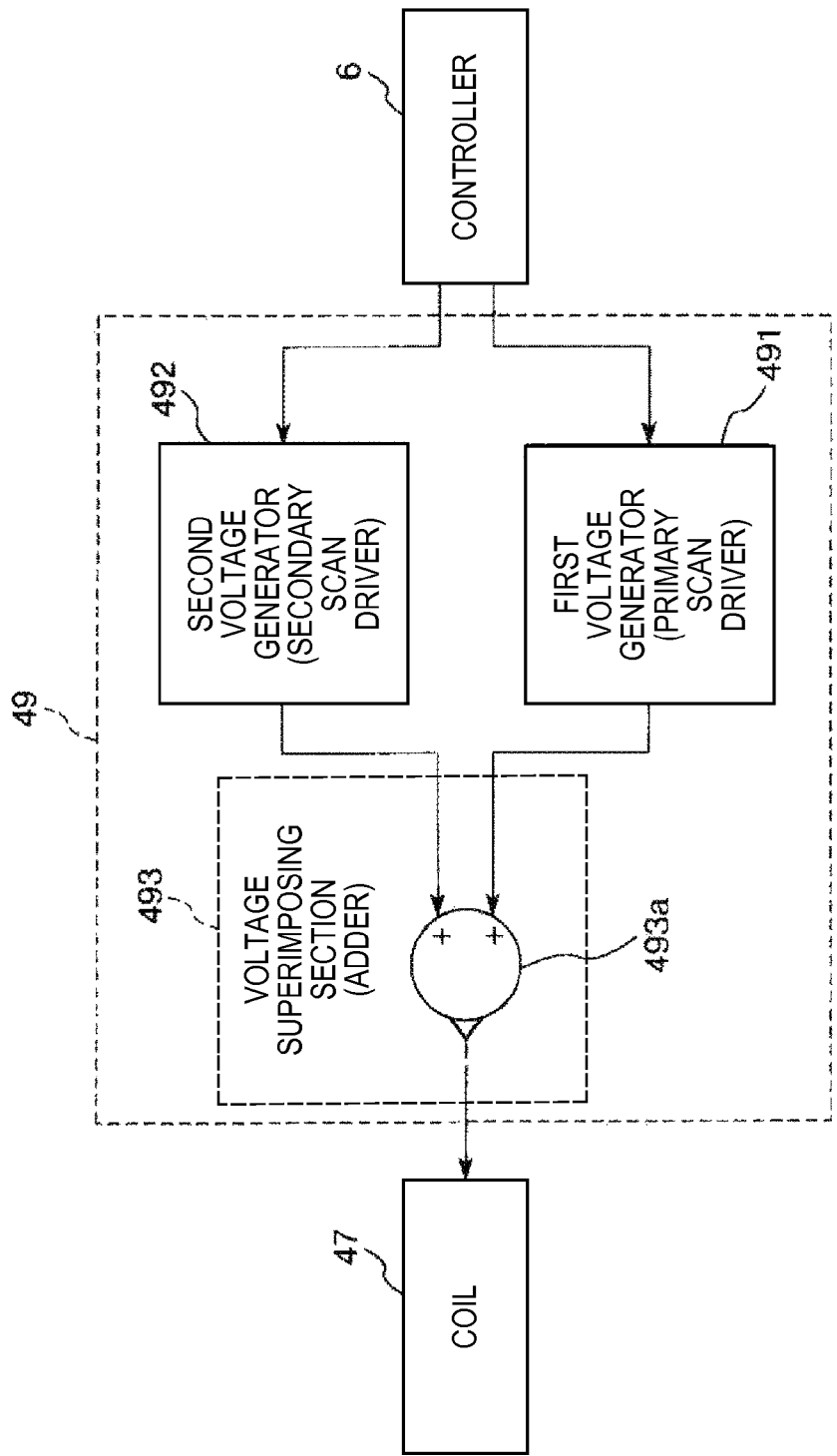
FIG. 6 is a block diagram of a voltage applying section provided in the optical scanner shown in FIG. 4.
Figure 7A:
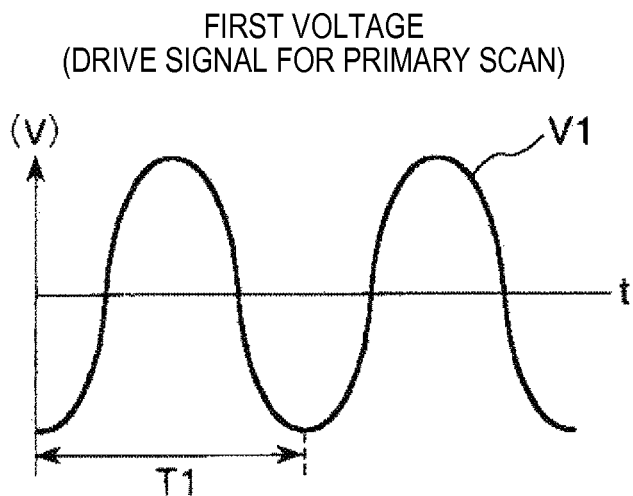
FIGS. 7A and 7B show examples of voltages generated by a first voltage generator and a second voltage generator shown in FIG. 6.
Figure 7B:
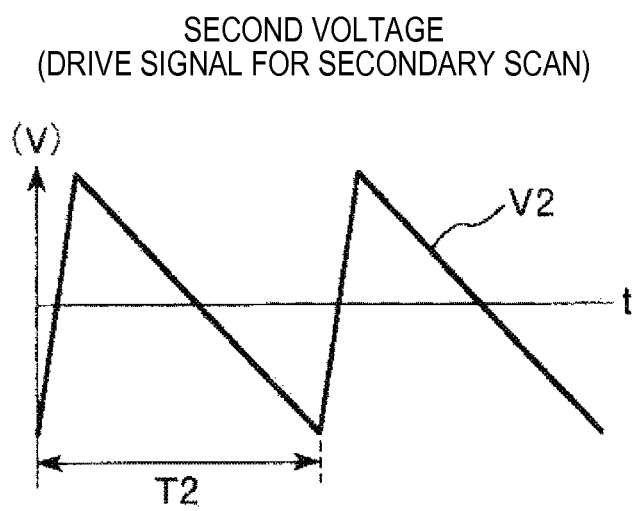

FIG. 1 is a plan view showing an image display apparatus according to a preferred embodiment of the invention. FIG. 2 is a cross-sectional view of a laser light flux emitted from each laser light source shown in FIG. 1. FIG. 3 is a side view of the image display apparatus shown in FIG. 1. FIG. 4 is a plan view showing an optical scan section (optical scanner) provided in the image display apparatus shown in FIG. 1. FIG. 5 is a cross-sectional view of the optical scanner shown in FIG. 4. FIG. 6 is a block diagram of a voltage applying section provided in the optical scanner shown in FIG. 4. FIGS. 7A and 7B show examples of voltages generated by a first voltage generator and a second voltage generator shown in FIG. 6. FIGS. 8A and 8B show a difference in drawable region caused by how the optical scanner is disposed. In the following description, the upper side in FIG. 5 is called "upper" and the lower side in FIG. 5 is called "lower" for ease of description. Further, three axes perpendicular to each other are called an X axis, a Y axis, and a Z axis, as shown in FIG. 1.

The image display apparatus 1 shown in FIG. 1 is an apparatus that scans an object 10, such as a screen and a wall surface, with light to display an image.

The image display apparatus 1 includes a drawing light source unit 2, which emits drawing laser light LL, a prism 3 (optical element), which inclines the optical axis of the drawing laser light LL and deforms the cross-sectional shape of the drawing laser light LL, an optical scan section 4, which deflects the drawing laser light LL having passed through the prism 3 for scanning, a detector 5, which detects the intensity of the drawing laser light LL, and a controller 6, which controls the operation of the drawing light source unit 2 and the optical scan section 4.

In the image display apparatus 1, the prism 3 is used as an optical element but can be replaced with any other optical element that provides the same advantageous effect provided by the function of the prism 3 that will be described later.

When a prism is used as the optical element as described in this embodiment, the configuration of the optical element can be simplified.

The image display apparatus 1 has an enclosure 9, which has a small-aspect shape having relatively large dimensions in the XY plane and a height in the Z-axis direction, and the enclosure 9 accommodates the drawing light source unit 2, the prism 3, the optical scan section 4, and the detector 5 arranged in the XY plane. The enclosure 9 in this embodiment has a substantially rectangular exterior shape when viewed from above in the thickness direction of the enclosure 9. The enclosure 9 further has a window 91 formed, for example, of a transparent member (made, for example, of glass or plastic), through which the drawing laser light LL being deflected by the optical scan section 4 for scanning exits out of the enclosure 9. The controller 6 may be accommodated in the enclosure 9 as in this embodiment or may be provided external to the enclosure 9.

The above components will be sequentially described below.

1-1. Drawing Light Source Unit

The drawing light source unit 2 includes laser light sources (light source sections) 21R, 21G, and 21B for the following colors: red; green; and blue and collimator lenses 22R, 22G, and 22B and dichroic mirrors 23R, 23G, and 23B provided in correspondence with the laser light sources 21R, 21G, and 21B, as shown in FIG. 1.

Each of the laser light sources 21R, 21G, and 21B has a light source and a drive circuit (not shown). The laser light source 21R emits a red laser light flux RR. The laser light source 21G emits a green laser light flux GG. The laser light source 21B emits a blue laser light flux BB. The laser light fluxes RR, GG, and BB are emitted in accordance with drive signals transmitted from the controller 6 and parallelized or substantially parallelized by the collimator lenses 22R, 22G, and 22B, respectively.

In this embodiment, the laser light sources 21R, 21B, and 21G are arranged in the −Y-axis direction in the order of the laser light source 21R, the laser light source 21B, and the laser light source 21G and disposed in the enclosure 9 in a left end portion thereof in FIG. 1. The laser light sources 21R, 21G, and 21B emit the laser light fluxes RR, GG, and BB, respectively, in the +X-axis direction. The thus arranged laser light sources 21R, 21G, and 21B occupy a relatively small space, allowing the size of the image display apparatus 1 (enclosure 9) to be reduced. It is noted that the arrangement of the laser light sources 21R, 21G, and 21B is not limited to the arrangement described above.

Each of the laser light sources 21R, 21G, and 21B can, for example, be an edge-emitting semiconductor laser, a surface-emitting semiconductor laser, or any other suitable semiconductor laser. Using a semiconductor laser allows the size of each of the laser light sources 21R, 21G, and 21B to be reduced.

When each of the laser light sources 21R, 21G, and 21B is formed of a semiconductor laser, the optical intensity distribution of each of the laser light fluxes RR, GG, and BB emitted from the laser light sources 21R, 21G, and 21B has in general a contour (what is called FFP: far field pattern) having a substantially elliptical shape. It is assumed in the following description that the "cross-sectional shape" of each of the laser light fluxes RR, GG, and BB has the same meaning as that of the "contour of the optical intensity distribution" of the corresponding one of the laser light fluxes RR, GG, and BB. That is, in this case, each of the laser light fluxes RR, GG, and BB emitted from the laser light sources 21R, 21G, and 21B in other words has a substantially elliptical cross-sectional shape. The cross-sectional shape used herein is the shape of a cross section perpendicular to the optical axis of each of the laser light fluxes RR, GG, and BB.

The laser light sources 21R, 21G, and 21B emit the laser light fluxes RR, GG, and BB, respectively, each of which has a substantially elliptical (oval) cross-sectional shape, as shown in FIG. 2. Each of the laser light sources 21R, 21G, and 21B is so disposed in the enclosure 9 that the major axis of the ellipse substantially coincides with the Z axis and the minor axis of the ellipse substantially coincides with the Y axis (XY plane). In other words, each of the laser light fluxes RR, GG, and BB emitted from the laser light sources 21R, 21G, and 21B has an angle of radiation in the Z-axis direction (in the direction of a normal to the XY plane) greater than the angle of radiation in the Y-axis direction (in-plane direction in XY plane). In this case, the three laser light sources 21R, 21G, and 21B can be arranged in the Y-axis direction at narrower intervals than in a case where the angles of radiation are configured in a reversed manner (in a case where the angle of radiation in the Z-axis direction is smaller than the angle of radiation in the Y-axis direction), whereby the dimensions of the enclosure 9 in the XY plane can be reduced. The size of the image display apparatus 1 can therefore be reduced.

Each of the laser light fluxes RR, GG, and BB emitted from the laser light sources 21R, 21G, and 21B is linearly polarized light. Further, the laser light fluxes RR, GG, and BB are s-polarized light, which is a light component polarized in a direction perpendicular to the reflection/transmission surfaces (light incident surfaces) of the dichroic mirrors 23R, 23G, and 23B and the light incident surface of the prism 3. That is, each of the laser light fluxes RR, GG, and BB emitted from the laser light sources 21R, 21G, and 21B is polarized light oscillating (polarized) in the Z-axis direction and has an elliptical cross-sectional shape the major axis of which coincides with the oscillating direction. When each of the laser light fluxes RR, GG, and BB is s-polarized light, the amount of loss of the laser light fluxes RR, GG, and BB produced when they are incident on the dichroic mirrors 23R, 23G, and 23B and the prism 3 can be reduced.

The dichroic mirror 23R is characterized in that it reflects the laser light flux RR. The dichroic mirror 23B is characterized in that it reflects the laser light flux BB and transmits the laser light flux RR. The dichroic mirror 23G is characterized in that it transmits the laser light flux GG and reflects the laser light fluxes RR and BB. The dichroic mirrors 23R, 23G, and 23B cause the optical axes of the color laser light fluxes RR, GG, and BB to coincide or substantially coincide (be combined) with each other so that the single drawing laser light LL is emitted in the +X-axis direction. That is, the dichroic mirrors 23R, 23G, and 23B form a light combining section 23, which combines the laser light fluxes RR, GG, and BB with each other.

In this embodiment, the dichroic mirror 23R, the dichroic mirror 23B, and the dichroic mirror 23G are arranged in this order in the −Y-axis direction in correspondence with the arrangement of the laser light sources 21R, 21B, and 21G. The dichroic mirror 23R is so disposed that it reflects the laser light flux RR emitted in the +X-axis direction from the laser light source 21R and causes the reflected light flux to travel in the −Y-axis direction. The dichroic mirror 23B is so disposed that it not only reflects the laser light flux BB emitted in the +X-axis direction from the laser light source 21B and causes the reflected light flux to travel in the −Y-axis direction but also transmits the laser light flux RR reflected off the dichroic mirror 23R in the −Y-axis direction. Further, the dichroic mirror 23G is so disposed that it not only transmits the laser light flux GG emitted in the +X-axis direction from the laser light source 21G but also reflects the laser light fluxes RR and BB reflected in the −Y-axis direction off the dichroic mirrors 23R and 23B and causes the reflected light fluxes to travel in the +X-axis direction. The thus configured light combining section 23 outputs the drawing laser light LL in the +X-axis direction.

The dichroic mirrors 23R, 23G, and 23B are preferably so disposed that a laser light flux of a shorter wavelength is incident on the prism 3 at a greater angle of incidence in consideration of dispersion resulting from the difference in refractive index among the wavelengths of the laser light fluxes. That is, the dichroic mirrors 23R, 23G, and 23B are disposed with their reflection surfaces slightly shifted from each other around the Z axis so that the following relationship is achieved: the angle of incidence $\theta O_R$ of the blue laser light flux BB>the angle of incidence $\theta_G$ of the green laser light flux GG>the angle of incidence $\theta_R$ of the red laser light flux RR.

1-2. Prism

The prism 3 is an optical element having a first function of inclining the optical axis of the drawing laser light LL, a second function of deforming the shape (cross-sectional shape) of the drawing laser light LL, and a third function of controlling the angle of radiation of the drawing laser light LL (collecting drawing laser light LL, for example). The prism 3 is a substantially colorless, transparent polyhedron made of glass or quartz. The prism 3 is not limited to a specific one as long as it has the functions described above and can, for example, be a triangular prism having a substantially triangular columnar shape. The angled portions of the triangular prism may, for example, be chamfered or otherwise rounded as long as the resultant shape does not affect the functions.

The first function will first be described. The prism 3 receives the drawing laser light LL incident through a light incident surface 31 and outputs the drawing laser light LL through a light exiting surface 32 in a direction inclined to the +X-axis direction toward the +Y-axis direction (direction toward inner portion of enclosure 9). That is, the prism 3 inclines the optical axis of the drawing laser light LL around the Z axis (in XY plane). The thus configured prism 3 can direct the drawing laser light LL toward an inner portion of the enclosure 9. The enclosure 9 therefore has a space large enough to place members along extensions of the optical axes of the light fluxes emitted from the laser light sources 21R and 21B, and the internal space of the enclosure 9 can be efficiently used by placing the optical scan section 4 in the space. That is, inclining the optical axis of the drawing laser light LL toward an inner portion of the enclosure 9 can reduce the volume of a dead space (unused space where no member is disposed) in the enclosure 9, whereby the size of the image display apparatus 1 can be reduced.

The second function described above will next be described. The prism 3 changes the cross-sectional shape of the drawing laser light LL that is perpendicular to the optical axis thereof from the substantially elliptical shape to a substantially circular shape. Specifically, the prism 3 changes the cross-sectional shape of the drawing laser light LL to a substantially circular shape by increasing the width of the cross-sectional shape of the incident drawing laser light LL in the direction in which the XY plane extends with the width thereof in the Z-axis direction substantially unchanged. In other words, the prism 3 changes the cross-sectional shape of the drawing laser light LL in such a way that the length of the minor axis of the elliptical cross-sectional shape is increased to a point where the ratio between the minor axis and the major axis (aspect ratio) is substantially one. When the cross-sectional shape of the drawing laser light LL becomes a substantially circular shape as described above, the image display apparatus 1 can provide excellent image display characteristics. Further, when the cross-sectional shape of the drawing laser light LL before it is incident on the prism 3 has a substantially elliptical shape the major axis of which extends in the Z-axis direction as described above, the prism 3 only needs to be angularly shifted in the XY plane, whereby the prism 3 can be so disposed that the length of the enclosure 9 in the thickness direction (Z-axis direction) corresponding to the space where the prism 3 occupies is minimized. As a result, the size (thickness) of the image display apparatus 1 can be reduced.

The third function described above will next be described. The light exiting surface 32 of the prism 3 is formed of a curved convex surface (lens surface) and hence functions as a collector lens that collects (focuses) the drawing laser light LL incident in the form of parallelized light on the prism 3. Focusing the drawing laser light LL as described above can increase the sharpness of an image displayed on the object 10 located in a position in the vicinity of the focal point (form an image having higher resolution). Further, the light exiting surface 32 having a function of a collector lens eliminates the necessity of separately providing a collector lens in addition to the prism 3, whereby the number of parts can be reduced and the size of the image display apparatus 1 can be reduced. The light exiting surface 32 of the prism 3 is not limited to a convex surface (collector lens) as long as the light exiting surface 32 can control the angle of radiation of the light that exits through the light exiting surface 32 and can, for example, be a concave surface (lens that causes light to diverge).

The drawing light source unit 2 and the prism 3 have been described in detail. In the image display apparatus 1, the optical axes of the laser light fluxes RR, GG, and BB (drawing laser light LL) are present in the same XY plane (first plane F), as shown in FIG. 3. That is, the following actions are made in the plane F: The laser light sources 21R, 21G, and 21B emit the laser light fluxes RR, GG, and BB; the light combining section 23 combines the laser light fluxes RR, GG, and BB and outputs the resultant drawing laser light LL; and the prism 3 inclines the optical axis of the drawing laser light LL in the XY plane.

1-3. Optical Scan Section

The optical scan section 4 has a function of deflecting the drawing laser light LL having passed through the prism 3 for two-dimensional scanning. The optical scan section 4 is not limited to a specific one and can be any device capable of deflecting the drawing laser light LL for two-dimensional scanning. For example, an optical scanner 40 having the following configuration can be used.

The optical scanner 40 includes a movable portion 41, a pair of shafts 421 and 422 (first shafts), a frame 43, two pairs of shafts 441, 442, 443, and 444 (second shafts), a support member 45, a permanent magnet 46, a coil 47, a magnet core 48, and a voltage applying section 49, as shown in FIGS. 4 and 5.

Among the components described above, the movable portion 41 and the pair of shafts 421 and 422 form a first oscillation system that swings (makes reciprocating motion) around the shafts 421 and 422 or a first axis J1. Further, the movable portion 41, the pair of shafts 421 and 422, the frame 43, the two pairs of shafts 441, 442, 443, and 444, and the permanent magnet 46 form a second oscillation system that swings (makes reciprocating motion) around a second axis J2. The permanent magnet 46, the coil 47, and the voltage applying section 49 form a driver that drives the first and second oscillation systems described above.

The components of the optical scanner 40 will be sequentially described below in detail.

The movable portion 41 includes a base 411 and a light reflection plate 413 fixed to the base 411 via a spacer 412, as shown in FIGS. 4 and 5. A light reflection portion 414, which reflects light, is provided on the upper surface (one surface) of the light reflection plate 413. The surface of the light reflection portion 414 forms a light reflection surface 414a, which reflects the drawing laser light LL. The movable portion 41 swings around the first axis J1 and the second axis J2, as described above. That is, it can be said that the base 411, the spacer 412, the light reflection plate 413, and the light reflection surface 414a, which form the movable portion 41, also swing around the first axis J1 and the second axis J2.

The light reflection plate 413 is so disposed that it is set apart from the shafts 421 and 422 in the thickness direction of the light reflection plate 413 but overlaps with the shafts 421 and 422 when viewed in the thickness direction (hereinafter also referred to as "plan view").

The configuration described above allows the area of the plate surface of the light reflection plate 413 to be increased while allowing the distance between the shaft 421 and the shaft 422 to be shortened. Further, since the distance between the shaft 421 and the shaft 422 can be shortened, the size of the frame 43 can be reduced. Moreover, since the size of the frame 43 can be reduced, the distance between the shafts 441, 442 and the shafts 443, 444 can be shortened. As a result, the size of the optical scanner 40 can be reduced with the area of the plate surface of the light reflection plate 413 increased.

The light reflection plate 413 is further so formed that it covers the entire shafts 421 and 422 in the plan view. In other words, the shafts 421 and 422 are located inside the outer circumference of the light reflection plate 413 in the plan view. The area of the plate surface of the light reflection plate 413 is thus increased, resulting in an increase in the area of the light reflection portion 414. The configuration further prevents unwanted light (light that has not been incident on light reflection portion 414, for example) from being reflected off the shafts 421 and 422 to form stray light.

The light reflection plate 413 is further so formed that it covers the entire frame 43 in the plan view. In other words, the frame 43 is located inside the outer circumference of the light reflection plate 413 in the plan view. The area of the plate surface of the light reflection plate 413 is thus increased, resulting in an increase in the area of the light reflection portion 414. The configuration further prevents the unwanted light from being reflected off the frame 43 to form stray light.

Further, the light reflection plate 413 is so formed that it covers the entire shafts 441, 442, 443, and 444 in the plan view. The area of the plate surface of the light reflection plate 413 is thus increased, resulting in an increase in the area of the light reflection portion 414. The configuration further prevents the unwanted light from being reflected off the shafts 441, 442, 443, and 444 to form stray light.

In this embodiment, the light reflection plate 413 has a circular shape in the plan view. The light reflection plate 413 does not necessarily have a circular shape and can have an elliptical shape or a rectangular or any other polygonal shape in the plan view.

The thus shaped light reflection plate 413 has a hard layer 415 provided on the lower surface thereof (the other surface, the surface of the light reflection plate 413 that faces the base 411).

The hard layer 415 is made of a material harder than the material of which the body of the light reflection plate 413 is made, whereby the rigidity of the light reflection plate 413 can be increased. The thus increased rigidity prevents the light reflection plate 413 from being bent or suppresses the amount of bending when the light reflection plate 413 swings. The thickness of the light reflection plate 413 can also be reduced, whereby the moment of inertia of the light reflection plate 413 around the first and second axes J1, J2 can be reduced when the light reflection plate 413 swings therearound.

The material of which the hard layer 415 is made is not limited to a specific one and can be any material harder than the material of which the body of the light reflection plate 413 is made, for example, diamond, quartz, sapphire, lithium tantalate, potassium niobate, or a carbon nitride film. It is, in particular, preferable to use diamond. The hard layer 415 is provided as necessary and can be omitted.

The lower surface of the light reflection plate 413 is fixed to the base 411 via the spacer 412. The light reflection plate 413 can therefore swing around the first axis J1 without the lower surface of the light reflection plate 413 coming into contact with the shafts 421, 422, the frame 43, or the shafts 441, 442, 443, 444.

Further, the base 411 is located inside the outer circumference of the light reflection plate 413 in the plan view. Moreover, the area of the base 411 in the plan view is preferably minimized to the extent that the base 411 can support the light reflection plate 413 via the spacer 412. In this case, the distance between the shaft 421 and the shaft 422 can be reduced, while the area of the plate surface of the light reflection plate 413 is increased.

The frame 43, which has a frame-like shape, is so disposed that it surrounds the base 411 of the movable portion 41 described above. In other words, the base 411 of the movable portion 41 is disposed inside the frame 43, which has a frame-like shape. The frame 43 is supported by the support member 45 via the shafts 441, 442, 443, and 444. The base 411 of the movable portion 41 is supported by the frame 43 via the shafts 421 and 422.

The length of the frame 43 in the direction along the first axis J1 is longer than the length thereof in the direction along the second axis J2. That is, a>b is satisfied, where "a" represents the length of the frame 43 in the direction along the first axis J1, and "b" represents the length of the frame 43 in the direction along the second axis J2. The length of the optical scanner 40 in the direction along the second axis J2 can therefore be reduced, while the length necessary for the shafts 421 and 422 is ensured.

Further, the frame 43 has a shape that follows the exterior shape of a structure formed of the base 411 of the movable portion 41 and the pair of shafts 421 and 422 in the plan view. The thus shaped frame 43 can be compact while allowing the first oscillation system formed of the movable portion 41 and the pair of shafts 421 and 422 to oscillate, that is, the movable portion 41 to oscillate around the first axis J1. The shape of the frame 43 is not limited to the illustrated shape but can be any frame-like shape.

Each of the shafts 421 and 422 and the shafts 441, 442, 443, and 444 is elastically deformable. The shafts 421 and 422 connect the movable portion 41 to the frame 43 in such a way that the movable portion 41 is swingable around the first axis J1. Further, the shafts 441, 442, 443, and 444 connect the frame 43 to the support member 45 in such a way that the frame 43 is swingable around the second axis J2, which is perpendicular to the first axis J1.

The shafts 421 and 422 are disposed on opposite sides of the base 411 of the movable portion 41. Further, each of the shafts 421 and 422 has an elongated shape extending in the direction along the first axis J1. Each of the shafts 421 and 422 has one end connected to the base 411 and the other end connected to the frame 43. Each of the shafts 421 and 422 is further so disposed that the central axis thereof coincides with the first axis J1. The thus configured shafts 421 and 422 are torsionally deformed when the movable portion 41 swings around the first axis J1.

The shafts 441, 442 and the shafts 443, 444 are disposed on opposite sides of the frame 43. Each of the shafts 441, 442, 443, and 444 has an elongated shape extending in the direction along the second axis J2. Further, each of the shafts 441, 442, 443, and 444 has one end connected to the frame 43 and the other end connected to the support member 45. Further, the shafts 441 and 442 are disposed on opposite sides of the second axis J2. Similarly, the shafts 443 and 444 are disposed on opposite sides of the second axis J2. The shafts 441, 442, 443, and 444 are so configured that the shafts 441 and 442 as a whole and the shafts 443 and 444 as a whole are torsionally deformed when the frame 43 swings around the second axis J2.

As described above, the movable portion 41 swingable around the first axis J1 and the frame 43 swingable around the second axis J2 allow the movable portion 41 (that is, light reflection plate 43) to swing around the two axes perpendicular to each other, the first and second axes J1, J2.

The shapes of the shafts 421 and 422 and the shafts 441, 442, 443, and 444 are not limited to those described above, and each of them may, for example, have a bent or curved portion or a branch in at least one position along the shaft.

The base 411, the shafts 421 and 422, the frame 43, the shafts 441, 442, 443, and 444, and the support member 45 described above are formed integrally with each other.

In this embodiment, the base 411, the shafts 421 and 422, the frame 43, the shafts 441, 442, 443, and 444, and the support member 45 are formed by etching an SOI substrate formed of a first Si layer (device layer), an SiO$_2$ layer (box layer), and a second Si layer (handle layer) stacked in this order. The configuration described above provides the first and second oscillation systems with excellent oscillation characteristics. Further, forming the base 411, the shafts 421 and 422, the frame 43, the shafts 441, 442, 443, and 444, and the support member 45 by using the SOI substrate, which allows etching-based micro-processing, not only provides excellent precision in their dimensions but also reduces the size of the optical scanner 40.

The first Si layer of the SOI substrate forms the base 411, the shafts 421, and 422, and the shafts 441, 442, 443, and 444. The shafts 421 and 422 and the shafts 441, 442, 443, and 444 therefore have excellent elasticity. Further, the base 411 will not come into contact with the frame 43 when the base 411 pivots around the first axis J1.

Each of the frame 43 and the support member 45 is formed of the SOI substrate or the stacked member formed of the first Si layer, the SiO$_2$ layer, and the second Si layer, whereby the frame 43 and the support member 45 have excellent rigidity. Further, the SiO$_2$ layer and the second Si layer of the frame 43 not only function as a rib that increases the rigidity of the frame 43 but also have a function of preventing the movable portion 41 from coming into contact with the permanent magnet 46.

The upper surface of each of the shafts 421 and 422, the shafts 441, 442, 443, and 444, the frame 43, and the support member 45, which are located outside the light reflection plate 413 in the plan view, preferably undergoes antireflection processing, which prevents unwanted light incident on portions other than the light reflection plate 413 from forming stray light. The antireflection processing is not limited to a specific one and can, for example, be formation of an antireflection film (dielectric multilayer film), surface roughing, and surface blackening.

The materials of which the base 411, the shafts 421 and 422, and the shafts 441, 442, 443, and 444 are made and the method for forming these components described above are presented by way of example and are not necessarily used in the invention.

Further, in this embodiment, the spacer 412 and the light reflection plate 413 are also formed by etching the SOI substrate. The spacer 412 is formed of a stacked member of the SiO$_2$ layer and the second Si layer of the SOI substrate. The light reflection plate 413 is formed of the first Si layer of the SOI substrate. The spacer 412 and the light reflection plate 413 bonded to each other can thus be manufactured in a simple, highly precise manner by forming the spacer 412 and the light reflection plate 413 based on the SOI substrate as described above.

The spacer 412 is bonded to the base 411 with an adhesive, a wax material, or any other suitable bonding material (not shown).

The permanent magnet 46 is bonded to the lower surface of the frame 43 described above. A method for bonding the permanent magnet 46 to the frame 43 is not limited to a specific one and can, for example, be a bonding method using an adhesive. The permanent magnet 46 is magnetized in a direction inclined to the first and second axes J1, J2 in the plan view.

In this embodiment, the permanent magnet 46 has an elongated shape (rod-like shape) extending in a direction inclined to the first and second axes J1, J2. The permanent magnet 46 is magnetized in the elongated direction. That is, the permanent magnet 46 is so magnetized that one end thereof forms an S pole and the other end thereof forms an N pole. Further, the permanent magnet 46 is so disposed that it is symmetrical with respect to the intersection of the first axis J1 and the second axis J2 in the plan view.

The inclination angle θ of the direction in which the permanent magnet 46 is magnetized (direction in which permanent magnet 46 extends) with respect to the second axis J2 is not limited to a specific value but is preferably greater than or equal to 30° but smaller than or equal to 60°, more preferably greater than or equal to 45° but smaller than or equal to 60°, still more preferably 45°. The thus disposed permanent magnet 46 allows the movable portion 41 to swing around the second axis J2 in a smooth, reliable manner.

The permanent magnet 46 can preferably be, for example, a neodymium magnet, a ferrite magnet, a samarium cobalt magnet, an Alnico magnet, or a bonded magnet. The permanent magnet 46 is a magnetized hard magnetic material and formed, for example, by placing a hard magnetic material not yet having been magnetized on the frame 43 and magnetizing the entire structure. The reason for this is that an attempt to place the permanent magnet 46, which has been magnetized, on the frame 43 may not result in successful placement of the permanent magnet 46 in a desired position in some cases because magnetic fields produced by objects outside the apparatus and other parts in the apparatus affect the placement of the permanent magnet 46.

The coil 47 is disposed immediately below the permanent magnet 46, whereby a magnetic field produced by the coil 47 can act on the permanent magnet 46 in an efficient manner. As a result, the electricity consumption and the size of the optical scanner 40 can be reduced. The coil 47 is wound around the magnetic core 48. The magnetic field produced by the coil 47 can thus act on the permanent magnet 46 in an efficient manner. The magnetic core 48 may be omitted.

The thus configured coil 47 is electrically connected to the voltage applying section 49. When the voltage applying section 49 applies a voltage to the coil 47, the coil produces a magnetic field having a magnetic flux perpendicular to the first and second axes J1, J2.

The voltage applying section 49 includes a first voltage generator 491 that generates a first voltage V1 for causing the movable portion 41 to pivot around the first axis J1, a second voltage generator 492 that generates a second voltage V2 for causing the movable portion 41 to pivot around the second axis J2, and a voltage superimposing section 493 that superimposes the first voltage V1 and the second voltage V2 on each other, and the superimposed voltage from the voltage superimposing section 493 is applied to the coil 47, as shown in FIG. 6.

The first voltage V1 (voltage for primary scan), which is generated by the first voltage generator 491, periodically changes at a period T1, as shown in FIG. 7A. The first voltage V1 has a sinusoidal waveform. The frequency of the first voltage V1 (1/T1) preferably ranges, for example, from 10 to 40 kHz. In this embodiment, the frequency of the first voltage V1 is set to be equal to a torsional resonant frequency (f1) of the first oscillation system formed of the movable portion 41 and the pair of shafts 421 and 422, whereby the angle of pivotal motion of the movable portion 41 around the first axis J1 can be increased.

On the other hand, the second voltage V2 (voltage for secondary scan), which is generated by the second voltage generator 492, periodically changes at a period T2 different from the period T1, as shown in FIG. 7B. The second voltage V2 has a saw-toothed waveform. The frequency of the second voltage V2 (1/T2) only needs to differ from the frequency of the first voltage V1 (1/T1) and preferably ranges, for example, from 30 to 80 Hz (about 60 Hz). In this embodiment, the frequency of the second voltage V2 is adjusted to be a frequency different from a torsional resonant frequency (resonant frequency) of the second oscillation system formed of the movable portion 41, the pair of shafts 421 and 422, the frame 43, the two pairs of shafts 441, 442, 443, and 444, and the permanent magnet 46.

The thus set frequency of the second voltage V2 is preferably lower than the frequency of the first voltage V1. In this case, the movable portion 41 is allowed to swing not only around the first axis J1 at the frequency of the first voltage V1 but also around the second axis J2 at the frequency of the second voltage V2 in a more reliable, smoother manner.

Now, let f1 [Hz] be the torsional resonant frequency of the first oscillation system and f2 [Hz] be the torsional resonant frequency of the second oscillation system, and f1 and f2 preferably satisfy $f2<f1$, more preferably $10 \times f2 \leq f1$. Satisfying the relationship described above allows the movable portion 41 to pivot not only around the first axis J1 at the frequency of the first voltage V1 but also around the second axis J2 at the frequency of the second voltage V2 in a smoother manner. On the other hand, when $f1 \leq f2$, the first oscillation system can oscillate at the frequency of the second voltage V2.

The thus configured first voltage generator 491 and second voltage generator 492 are connected to the controller 6 and driven based on signals from the controller 6. The voltage superimposing section 493 is connected to the first voltage generator 491 and the second voltage generator 492.

The voltage superimposing section 493 includes an adder 493a for applying a voltage to the coil 47. The adder 493a receives the first voltage V1 from the first voltage generator 491, receives the second voltage V2 from the second voltage generator 492, superimposes the voltages on each other, and applies the resultant voltage to the coil 47.

A description will next be made of a method for driving the optical scanner 40. It is assumed that the frequency of the first voltage V1 is set to be equal to the torsional resonant frequency of the first oscillation system, and that the frequency of the second voltage V2 is set to be not only different from the torsional resonant frequency of the second oscillation system but also smaller than the frequency of the first voltage V1 (for example, the frequency of the first voltage V1 is set at 15 kHz, and the frequency of the second voltage V2 is set at 60 Hz).

For example, when the voltage superimposing section 493 superimposes the first voltage V1 shown in FIG. 7A and the second voltage V2 shown in FIG. 7B on each other and applies the superimposed voltage to the coil 47, the first voltage V1 produces the following alternately switching magnetic fields: a magnetic field that causes the one end (N pole) of the permanent magnet 46 to be attracted to the coil 47 and the other end (S pole) of the permanent magnet 46 to be repulsed from the coil 47 (the magnetic field is referred to as "magnetic field A1"); and a magnetic field that causes the one end (N pole) of the permanent magnet 46 to be repulsed from the coil 47 and the other end (S pole) of the permanent magnet 46 to be attracted to the coil 47 (the magnetic field is referred to as "magnetic field A2").

When the magnetic field Al and the magnetic field A2 are alternately switched from each other as described above, oscillation having a torsional oscillation component around the first axis J1 is excited in the frame 43, and the oscillation causes the shafts 421 and 422 to be torsionally deformed and hence the movable portion 41 to swing around the first axis J1 at the frequency of the first voltage V1. Since the frequency of the first voltage V1 is equal to the torsional resonant frequency of the first oscillation system, the resonant oscillation allows the movable portion 41 to swing at a large amplitude.

On the other hand, the second voltage V2 produces the following alternately switching magnetic fields: a magnetic field that causes the one end (N pole) of the permanent magnet 46 to be attracted to the coil 47 and the other end (S pole) of the permanent magnet 46 to be repulsed from the coil 47 (the magnetic field is referred to as "magnetic field B1"); and a magnetic field that causes the one end (N pole) of the permanent magnet 46 to be repulsed from the coil 47 and the other end (S pole) of the permanent magnet 46 to be attracted to the coil 47 (the magnetic field is referred to as "magnetic field B2").

When the magnetic field B1 and the magnetic field B2 are alternately switched from each other as described above, the shafts 441, 442 and the shafts 443, 444 are torsionally deformed and the frame 43 along with the movable portion 41 swings around the second axis J2 at the frequency of the second voltage V2. Since the frequency of the second voltage V2 is set to be greatly lower than the frequency of the first voltage V1 and the torsional resonant frequency of the second oscillation system is set to be lower than the torsional resonant frequency of the first oscillation system as described above, the pivotal motion of the movable portion 41 around the first axis J1 will not occur at the frequency of the second voltage V2.

As described above, when the first voltage V1 and the second voltage V2 superimposed on each other are applied to the coil 47 in the optical scanner 40, the movable portion 41 can pivot not only around the first axis J1 at the frequency of the first voltage V1 but also around the second axis J2 at the frequency of the second voltage V2. The thus configured optical scanner 40 allows the cost and size of the apparatus to be reduced and causes the movable portion 41 to swing around the first and second axes J1, J2 based on the electro-magnetic drive method (moving magnet method), whereby the drawing laser light LL reflected off the light reflection portion 414 can be deflected for two-dimensional scanning. Further, since the number of parts that form the drive source (permanent magnet and coil) can be reduced, the resultant configuration can be simple and compact. Moreover, since the coil 47 is set apart from the oscillation systems of the optical scanner 40, heat generated by the coil 47 will not adversely affect the oscillation systems.

The configuration of the optical scanner 40 has been described above in detail. According to the gimbal-type, two-dimensional-scanning optical scanner 40 described above, which is alone capable of deflecting the drawing laser light LL for two-dimensional scanning, the size of the optical scan section 4 can be reduced and alignment adjustment thereof can be readily made as compared, for example, with a configuration in which two one-dimensional-scanning optical scanners are combined with each other to deflect the drawing laser light LL for two-dimensional scanning.

The optical scanner 40 is an electro-magnetically driven optical scanner driven by using the permanent magnet 46 and the coil 47. The thus configured optical scanner 40 requires the permanent magnet 46 and the coil 47 to face each other as shown in FIG. 5, which increases the thickness of the optical scanner 40 (length in the direction of an axis J3 that intersects the intersection of the first and second axes J1, J2 and is perpendicular to the two axes). However, the size of the optical scanner 40 in the in-plane direction in the plane including the first and second axes J1, J2 can be reduced. As described above, the optical scanner 40, the size of which in the in-plane direction described above is reduced instead of the size in the thickness direction, can form an optical scanner suitable for the image display apparatus 1.

The optical scanner 40 having the configuration described above is so disposed in the enclosure 9 that the light reflection portion 414 is perpendicular to the XY plane when the optical scanner 40 is not driven (when no voltage is applied to the coil 47) as shown in FIGS. 1 and 3. In other words, the optical scanner 40 is so disposed in the enclosure 9 that the plane including the first and second axes J1, J2 is perpendicular to the XY plane (the axis J3 is present in the plane F). Since the optical scanner 40 has a small size in the in-plane direction in the plane including the first and second axes J1, J2 as described above, disposing the optical scanner 40 as described above allows the size (thickness) of the image display apparatus 1 (enclosure 9) to be reduced. Although the optical scanner 40 is not so thin in the direction of the axis J3 but is so disposed in the image display apparatus 1 that the axis J3 is present in the plane F, an increase in the size of the apparatus resulting from the thickness in the direction of the axis J3 is minimized.

Further, the drawing laser light LL having passed through the prism 3 is incident on the light reflection portion 414 in a direction inclined to the axis J3. When the drawing laser light LL is incident on the light reflection portion 414 in a direction inclined to the axis J3 (normal to light reflection surface 414a), the drawing laser light LL deflected by the optical scanner 40 for scanning can exit out of the enclosure 9 without interfering with other members (prism 3, for example) in the enclosure 9. It is therefore not necessary to provide a flat mirror, a prism, or any other optical component for changing the optical path of the drawing laser light LL deflected by the optical scanner 40 for scanning, whereby the size of the image display apparatus 1 can be reduced.

Further, in the optical scanner 40, the amplitude of the oscillation (angle of swing motion) of the resonantly driven movable portion 41 around the first axis J1 is greater than the amplitude of the oscillation of the non-resonantly driven movable portion 41 around the second axis J2. The optical scanner 40 is so disposed that the amplitude in the Z-axis direction is greater than the amplitude in the in-plane direction in the XY plane. That is, the optical scanner 40 is so disposed that the first axis J1 is parallel to the in-plane direction in the XY plane (coincides with the plane F) and the second axis J2 is parallel to the Z axis. Disposing the optical scanner 40 as described above provides the following advantageous effects.

Since the drawing laser light LL is incident on the light reflection portion 414 in a direction inclined to the axis J3 as described above, the drawable region S irradiated with the drawing laser light LL deflected by the light reflection portion 414 for two-dimensional scanning is shaped as shown in FIGS. 8A and 8B. FIG. 8A shows a drawable region available when the optical scanner 40 is so disposed that the first axis J1 is parallel to the in-plane direction in the XY plane and the second axis J2 is parallel to the Z axis as described in this embodiment. Conversely, FIG. 8B shows a drawable region available when the optical scanner 40 is so disposed that the first axis J1 is parallel to the Z axis and the second axis J2 is parallel to the in-plane direction in the XY plane. As shown in FIGS. 8A and 8B, the distortion of the drawable region S in FIG. 8A is smaller than in FIG. 8B, whereby this embodiment provides a larger effective rectangular drawing region (region actually irradiated with the drawing laser light LL for image display) S' ensured in the drawable region S. Therefore, the drawable region S can be used more effectively in FIG. 8A than in FIG. 8B, and a more efficient, larger image can be drawn.

The optical scanner 40 is preferably so disposed that the drawable region shown in FIG. 8A is provided but may alternatively be so disposed that the drawable region shown in FIG. 8B is provided.

1-4. Detector

The detector 5 has a function of detecting the intensity of the drawing laser light LL (each of the laser light fluxes RR, GG, and BB). The thus configured detector 5 includes a light receiving device 51, such as a photodiode, disposed in the enclosure 9. The light incident surface 31 of the prism 3 is configured to slightly (at a reflectance of about 0.1%, for example) reflect the laser light fluxes RR, GG, and BB, and the light receiving device 51 is located on the optical paths of the reflected light fluxes. The light receiving device 51 outputs a signal (voltage) having a magnitude according to the intensity of each of the received reflected light fluxes, and the intensity of each of the laser light fluxes RR, GG, and BB can be detected based on the signal.

Information on the detected intensities of the laser light fluxes RR, GG, and BB is sent to the controller 6, which then controls the drive operation of the laser light sources 21R, 21G, and 21B based on the received information.

Specifically, the reflectance and transmittance representing how much the collimator lenses 22R, 22G, and 22B and the dichroic mirrors 23R, 23G, and 23B reflect and transmit the laser light fluxes RR, GG, and BB and the reflectance representing how much the light incident surface 31 reflects the laser light fluxes RR, GG, and BB are measured in advance, and the measurement information is stored in a memory (not shown) in the controller 6.

Subsequently, for example, before image drawing is initiated, the controller 6 sends a drive signal of a predetermined magnitude (voltage) to the drive circuit associated with the laser light source 21R, which then emits the laser light flux RR. Part of the laser light flux RR is then reflected off the light incident surface 31 of the prism 3, and the light receiving device 51 receives the reflected light and detects the intensity thereof. The actual intensity of the laser light flux RR emitted from laser light source 21R is then determined based on the reflectance stored in the memory described above and representing how much each of the portions described above reflects the laser light flux RR. The relationship between the intensity of the laser light flux RR and the magnitude (voltage value) of the drive signal is thus determined, and the magnitude of the drive signal necessary to provide the laser light flux RR of a predetermined intensity is found.

The relationship is stored in the memory described above. To draw an image, the controller 6 sends the drive circuit a desired drive signal that causes the laser light source 21R to emit a laser light flux RR of a desired intensity based on the relationship. The same holds true for the laser light fluxes GG and BB. Specifically, the relationship between the intensity of each of the laser light fluxes GG and BB and the magnitude of the corresponding drive signal is determined, and the controller 6 sends the drive circuit desired drive signals that cause the laser light sources 21G and 21B to emit laser light fluxes GG and BB of desired intensities based on the determined relationships.

Drawing laser light LL of a desired color and luminance can thus be produced, and the image display characteristics are improved.

The above description has been made with reference to the case where the relationship between the intensity of the laser light flux RR and the magnitude (voltage value) of the drive signal is provided before image drawing is initiated. The relationship is not necessarily provided before image drawing is initiated and may, for example, be provided in the course of image drawing. The effective drawing region S' in the drawable region S is irradiated with the drawing laser light LL, whereas the other region (non-drawing region S") is not irradiated therewith, as described above. In view of the fact described above, the relationship between the intensity of the laser light flux RR and the magnitude (voltage value) of the drive signal may alternatively be provided as described above during a period when an image is being drawn but the movable portion 41 (light reflection portion 414) faces the non-drawing region S" and no drawing laser light LL is outputted.

1-5. Controller

The controller 6 has a function of controlling the operation of the drawing light source unit 2 and the optical scan section 4. Specifically, the controller 6 drives the optical scanner 40 to cause the movable portion 41 to swing around the first and second axes J1, J2 and drives the drawing light source unit 2 to emit the drawing laser light LL in synchronization with the swing motion of the movable portion 41. The controller 6 drives the laser light sources 21R, 21G, and 21B to emit laser light fluxes RR, GG, and BB of predetermined intensities at predetermined timings based, for example, on image data sent from an external computer so that the drawing laser light LL of a predetermined color and intensity (luminance) is emitted at a predetermined timing. As a result, an image according to the image data is displayed on the object 10.

The configuration of the image display apparatus 1 has been described in detail.

In the image display apparatus 1 described above, the members thereof, that is, the laser light sources 21R, 21G, and 21B, the collimator lenses 22R, 22G, and 22B, the dichroic mirrors 23R, 23G, and 23B, the prism 3, the optical scanner 40, and the light receiving device 51 are arranged in a flat plane (the same plane) extending in the direction in which the XY plane extends. The optical axes of the laser light fluxes RR, GG, and BB emitted from the laser light sources 21R, 21G, and 21B and the optical axis of the drawing laser light LL, which is the combination of the laser light fluxes RR, GG, and BB, are present in the same plane (first plane F) parallel to the XY plane until the drawing laser light LL is incident on the optical scanner 40. Further, in the image display apparatus 1, since the prism 3 inclines the optical axis of the drawing laser light LL within the plane F, the components of the image display apparatus 1 (optical scanner 40, in particular) can be arranged in the flat plane. In this case, the components of the image display apparatus 1 can be aligned with each other in the flat plane, whereby the image display apparatus 1 can be readily assembled. Further, in the image display apparatus 1, since the prism 3 shapes the drawing laser light LL, excellent image display characteristics are provided.

2. Head-Up Display

A description will next be made of the configuration of a head-up display based on the image display apparatus according to the embodiment of the invention.

Figure 9:
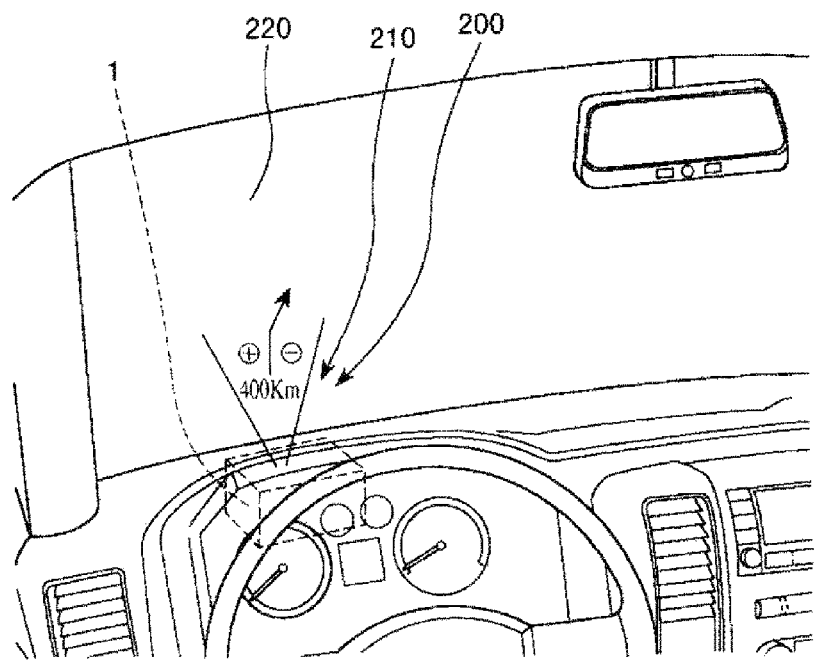
FIG. 9 is a perspective view showing a head-up display based on the image display apparatus according to the embodiment of the invention.

FIG. 9 is a perspective view showing a head-up display based on the image display apparatus according to the embodiment of the invention.

In a head-up display system 200, the image display apparatus 1 is accommodated in a dashboard of an automobile to form a head-up display 210, as shown in FIG. 9. The head-up display 210 can display a predetermined image, such as a displayed image that guides a driver to a destination, on a windshield 220. The head-up display system 200 is not necessarily used with an automobile and may be used, for example, with an airplane and a ship.

3. Head-Mounted Display

A description will next be made of a head-mounted display based on the image display apparatus according to the embodiment of the invention (head-mounted display according to an embodiment of the invention).

Figure 10:
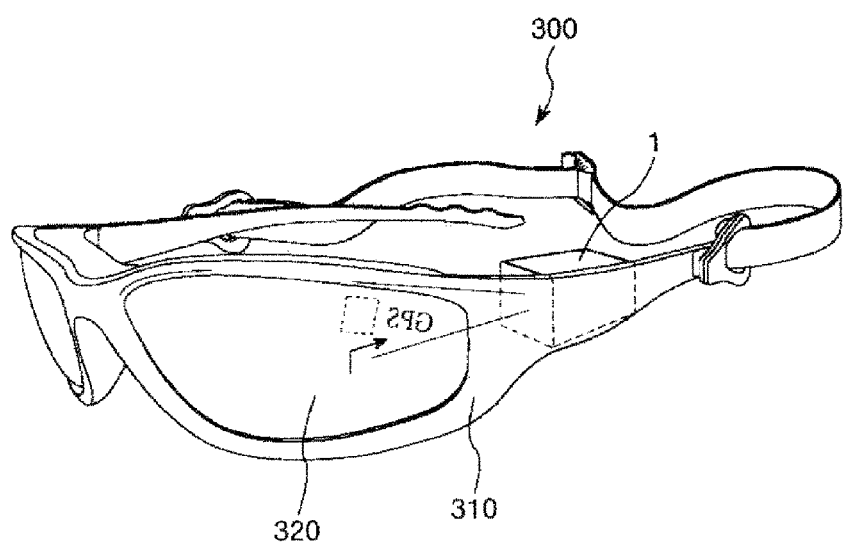
FIG. 10 is a perspective view showing a head-mounted display according to an embodiment of the invention.

FIG. 10 is a perspective view showing a head-mounted display according to an embodiment of the invention.

A head-mounted display 300 includes glasses 310 and the image display apparatus 1 mounted on the glasses 310, as shown in FIG. 10. The image display apparatus 1 displays a predetermined image in a display section (light reflector) 320 provided in a portion of the glasses 310 that originally functions as a lens, and the image is viewed with one of the eyes.

The display section 320 may be transparent or opaque. When the display section 320 is transparent, information from the image display apparatus 1 can be superimposed on information from the real world and the superimposed information can be viewed. Further, the display section 320 only needs to reflect at least part of light incident thereon and can, for example, be a half-silvered mirror.

The head-mounted display 300 may alternatively be provided with two image display apparatus 1, and two display sections display images viewed with both eyes.

The image display apparatus and the head-mounted display according to the embodiments of the invention have been described with reference to the drawings, but the invention is not limited thereto. The configuration of each of the components can be replaced with an arbitrary configuration having the same function. Further, other arbitrary components may be added to the embodiments of the invention.

The entire disclosure of Japanese Patent Application No. 2012-127448, filed Jun. 4, 2012 is expressly incorporated by reference herein.

What is claimed is:

1. An image display apparatus comprising:
a plurality of light source sections each of which emits a light flux;
a light combining section that combines the light fluxes emitted from the plurality of light source sections;
an optical element that inclines an optical axis of a combined light from the light combining section and changes a cross-sectional shape of the combined light from the light combining section; and
an optical scan section that deflects light exiting out of the optical element for two-dimensional scanning,
wherein an optical axis of the light flux emitted from each of the plurality of light source sections and directed through the light combining section and the optical element toward the optical scan section is present in a first plane,
the optical scan section has a light reflection surface that is configured to be perpendicular to the first plane when the optical scan section is not driven and swings around a first axis present in the first plane and a second axis parallel to the direction of a normal to the first plane, and
an angle of radiation of the light flux emitted from each of the plurality of light source sections in the direction of the normal to the first plane is greater than an angle of radiation of the emitted light flux in an in-plane direction in the first plane.

2. The image display apparatus according to claim 1, wherein the optical element is a prism.

3. The image display apparatus according to claim 2, wherein the light flux emitted from each of the light source sections is linearly polarized light that behaves as s-polarized light with respect to a light incident surface of the prism.

4. The image display apparatus according to claim 2, wherein the prism increases the width of the cross-sectional shape of the combined light from the light combining section in the in-plane direction in the first plane.

5. The image display apparatus according to claim 2, wherein a light exiting surface of the prism is a light collecting lens surface.

6. The image display apparatus according to claim 2, further comprising:
a detector that detects the amount of light reflected off a light incident surface of the prism; and
a controller that controls drive operation of the light source sections based on the amount of light detected by the detector.

7. The image display apparatus according to claim 1, wherein the light reflection surface is irradiated with the combined light traveling in a direction inclined to a normal to the light reflection surface.

8. The image display apparatus according to claim 7, wherein the amplitude of the swing motion of the light reflection surface around the first axis is greater than the amplitude of the swing motion of the light reflection surface around the second axis.

9. The image display apparatus according to claim 1, wherein the plurality of light source sections, the light combining section, the optical element, and the optical scan section are arranged in the in-plane direction in the first plane.

10. The image display apparatus according to claim 1, wherein the optical scan section includes a movable portion having the light reflection surface, a frame that surrounds the movable portion, a support member that supports the frame, a first shaft that connects the movable portion to the frame in such a way that the movable portion is swingable around the first axis relative to the frame, and a second shaft that connects the frame to the support member in such a way that the frame is swingable around the second axis relative to the support member.

11. The image display apparatus according to claim 10, wherein the optical scan section further includes a permanent magnet provided on the frame and a coil that faces the frame and produces a magnetic field that acts on the permanent magnet.

12. A head-mounted display comprising:
a light reflector that reflects at least part of light incident thereon; and
an image display apparatus that irradiates light to the light reflector,
the image display apparatus including
a plurality of light source sections each of which emits a light flux,
a light combining section that combines the light fluxes emitted from the plurality of light source sections,
an optical element that inclines an optical axis of a combined light from the light combining section and changes a cross-sectional shape of the combined light from the light combining section, and
an optical scan section that deflects light exiting out of the optical element for two-dimensional scanning,
wherein an optical axis of the light flux emitted from each of the plurality of light source sections and directed through the light combining section and the optical element toward the optical scan section is present in a first plane,
the optical scan section has a light reflection surface that is configured to be perpendicular to the first plane when the optical scan section is not driven and swings around a first axis present in the first plane and a second axis parallel to the direction of a normal to the first plane, and
an angle of radiation of the light flux emitted from each of the plurality of light source sections in the direction of the normal to the first plane is greater than an angle of radiation of the emitted light flux in an in-plane direction in the first plane.

13. The head-mounted display according to claim 12, wherein the optical element is a prism.

14. The head-mounted display according to claim 13, wherein the light flux emitted from each of the light source sections is linearly polarized light that behaves as s-polarized light with respect to a light incident surface of the prism.

15. The head-mounted display according to claim 13, wherein the prism increases the width of the cross-sectional shape of the combined light from the light combining section in the in-plane direction in the first plane.

16. The head-mounted display according to claim 13, wherein a light exiting surface of the prism is a light collecting lens surface.

17. The head-mounted display according to claim 13, further comprising
a detector that detects the amount of light reflected off a light incident surface of the prism, and
a controller that controls drive operation of the light source sections based on the amount of light detected by the detector.

18. The head-mounted display according to claim 12, wherein the light reflection surface is irradiated with the combined light traveling in a direction inclined to a normal to the light reflection surface.

19. The head-mounted display according to claim 18, wherein the amplitude of the swing motion of the light reflection surface around the first axis is greater than the amplitude of the swing motion of the light reflection surface around the second axis.

20. The head-mounted display according to claim 12, wherein the plurality of light source sections, the light combining section, the optical element, and the optical scan section are arranged in the in-plane direction in the first plane.

* * * * *